US008826195B2

(12) United States Patent
Lee et al.

(10) Patent No.: US 8,826,195 B2
(45) Date of Patent: Sep. 2, 2014

(54) LAYOUT MODIFICATION METHOD AND SYSTEM

(75) Inventors: Meng-Xiang Lee, Dounan Township, Yunlin County (TW); Li-Chung Hsu, Taichung (TW); Shih-Hsien Yang, Hsinchu (TW); Ho Che Yu, Zhubei (TW); King-Ho Tam, Hsinchu (TW); Chung-Hsing Wang, Baoshan Township, Hsinchu County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/530,164

(22) Filed: Jun. 22, 2012

(65) Prior Publication Data

US 2013/0326438 A1 Dec. 5, 2013

Related U.S. Application Data

(60) Provisional application No. 61/655,634, filed on Jun. 5, 2012.

(51) Int. Cl.
*G06F 17/50* (2006.01)
(52) U.S. Cl.
USPC ............... 716/55; 716/50; 716/52; 716/54; 716/56; 430/5; 430/30
(58) Field of Classification Search
USPC ...................... 716/50–56; 430/5, 30
See application file for complete search history.

(56) References Cited

U.S. PATENT DOCUMENTS

| 6,938,236 | B1 * | 8/2005 | Park et al. ............... 716/103 |
| 7,165,230 | B2 * | 1/2007 | Park ............... 326/41 |
| 7,441,211 | B1 | 10/2008 | Gupta et al. |
| 7,523,436 | B2 * | 4/2009 | Mizuno et al. .............. 716/50 |
| 7,603,648 | B2 * | 10/2009 | Liu et al. .............. 716/50 |
| 8,214,774 | B2 * | 7/2012 | Nardone et al. ............ 716/54 |
| 2003/0188268 | A1 * | 10/2003 | Konstadinidis et al. ........ 716/2 |
| 2003/0229882 | A1 * | 12/2003 | Ludwig et al. ............. 716/19 |
| 2004/0039997 | A1 | 2/2004 | Chiang et al. |
| 2005/0280438 | A1 * | 12/2005 | Park ................ 326/41 |
| 2007/0074142 | A1 * | 3/2007 | Smayling et al. ........... 716/21 |
| 2008/0010628 | A1 * | 1/2008 | Jung et al. ............ 716/19 |
| 2008/0077907 | A1 * | 3/2008 | Kulkami ............. 716/20 |
| 2008/0097729 | A1 * | 4/2008 | Jung et al. ............ 703/1 |
| 2009/0075183 | A1 * | 3/2009 | Cecil ............... 430/5 |
| 2009/0100396 | A1 * | 4/2009 | Smayling et al. ............ 716/8 |

(Continued)

*Primary Examiner* — Nha Nguyen
(74) *Attorney, Agent, or Firm* — Duane Morris LLP; Steven E. Koffs

(57) ABSTRACT

A method comprises providing a non-transitory, machine-readable storage medium storing a partial netlist of at least a portion of a previously taped-out integrated circuit (IC) layout, representing a set of photomasks for fabricating an IC having the IC layout such that the IC meets a first specification value. A computer identifies a proper subset of a plurality of first devices in the IC layout, such that replacement of the proper subset of the first devices by second devices in a revised IC layout satisfies a second specification value different from the first specification value. At least one layout mask is generated and stored in at least one non-transitory machine readable storage medium, accessible by a tool for forming at least one additional photomask, such that the set of photomasks and the at least one additional photomask are usable to fabricate an IC according to the revised IC layout.

20 Claims, 11 Drawing Sheets

(56) References Cited

U.S. PATENT DOCUMENTS

2009/0293037 A1* 11/2009 Liu et al. .................... 716/19
2011/0035717 A1    2/2011 Lu et al.
2011/0060888 A1*  3/2011 Keeth et al. ................ 711/209
2011/0209105 A1*  8/2011 Zhang ......................... 716/53
2012/0032702 A1*  2/2012 Lee et al. ..................... 326/81
2012/0319246 A1* 12/2012 Tan et al. ..................... 257/618
2013/0080990 A1*  3/2013 Singh ......................... 716/133
2013/0191796 A1*  7/2013 Chen et al. ................... 716/55

* cited by examiner

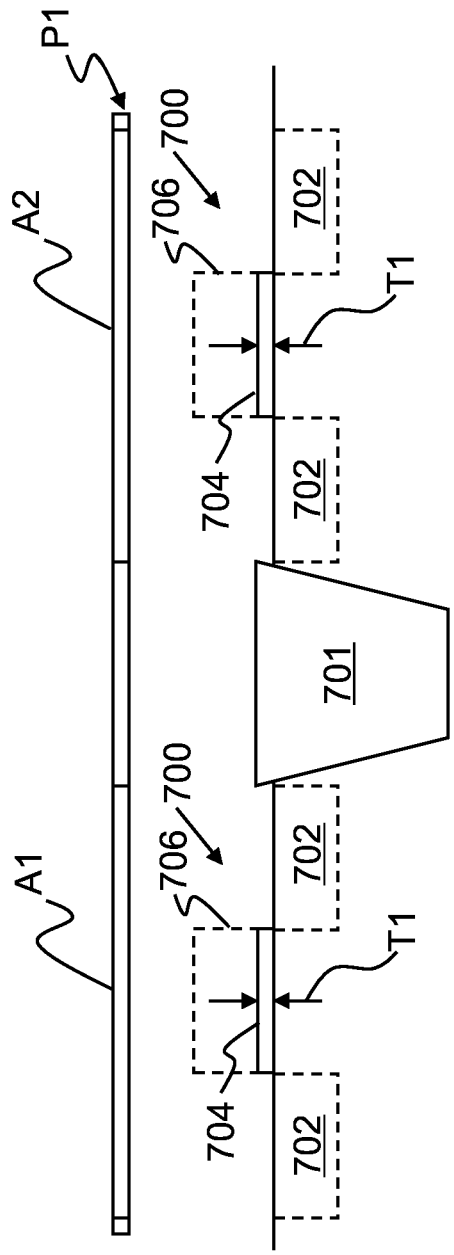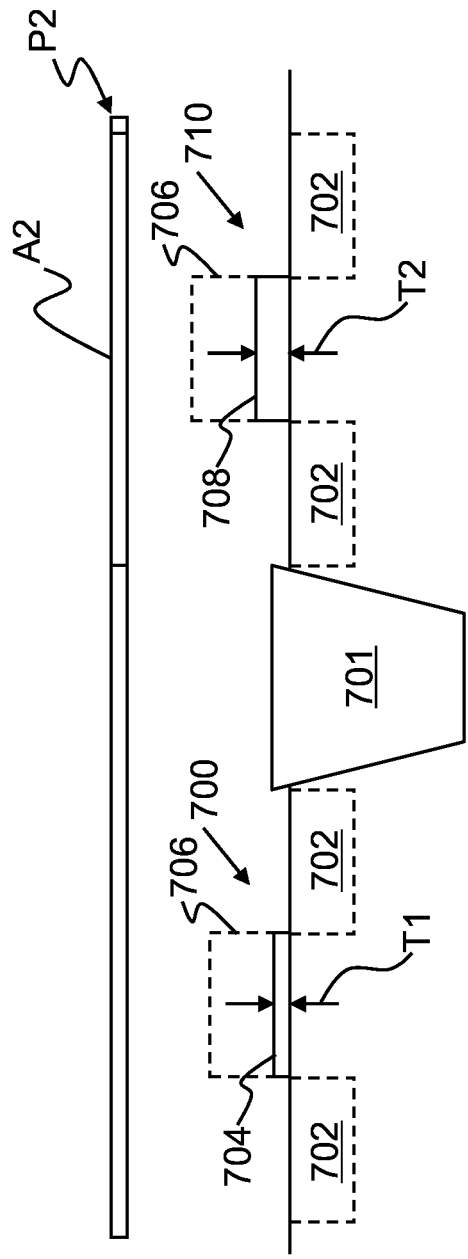

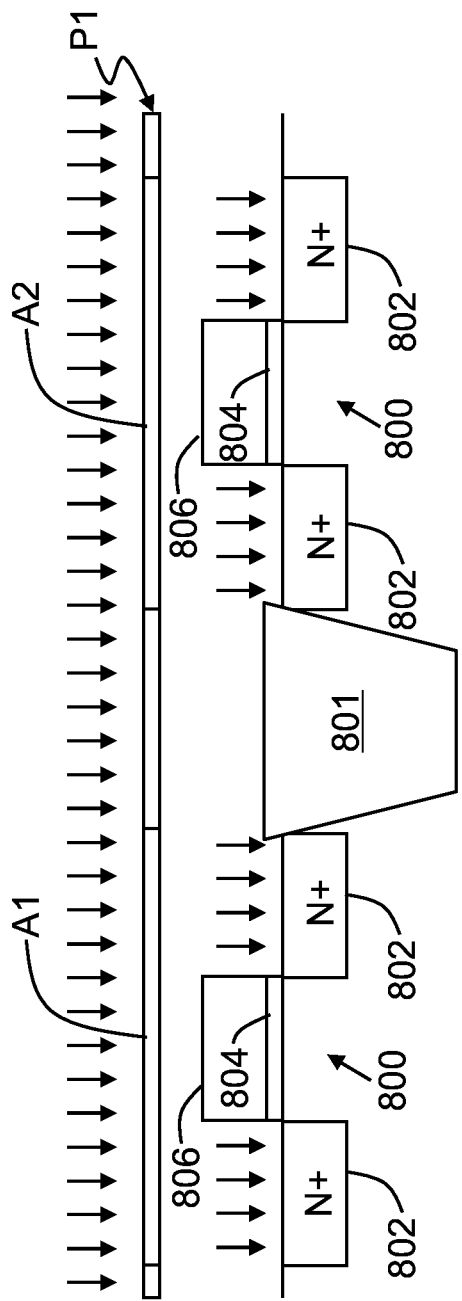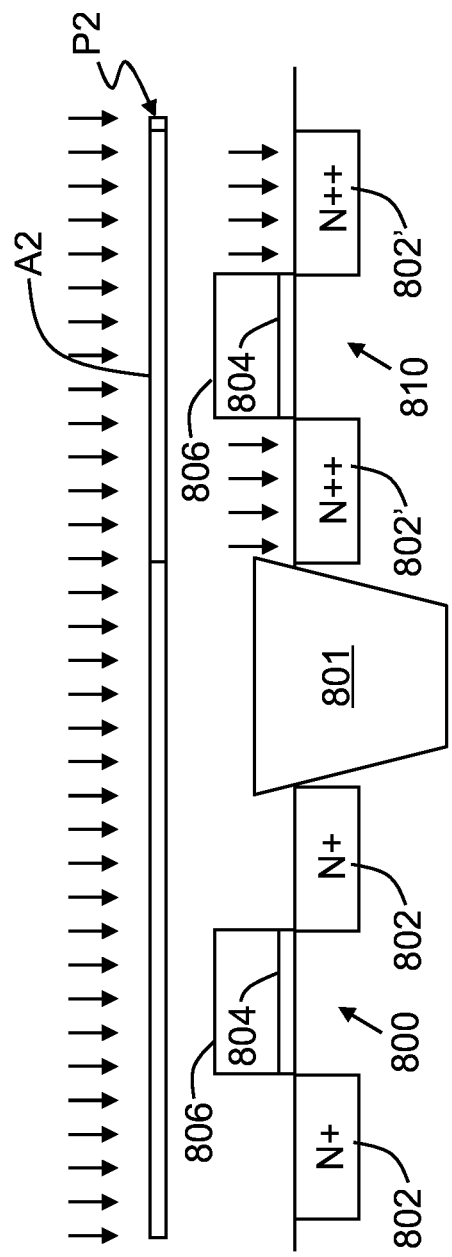
FIG. 8A
FIG. 8B

LAYOUT MODIFICATION METHOD AND SYSTEM

This application claims priority to, and hereby incorporates by reference in its entirety, U.S. Provisional Patent Application Ser. No. 61/655,634 filed on Jun. 5, 2012.

FIELD

The present disclosure relates to electronic design automation tools used for semiconductor integrated circuit (IC) design and photomask layout generation.

BACKGROUND

Semiconductor foundries and standard cell library vendors are continuously improving the designs of standard cells and reusable components.

Modern design processes for integrated circuits make extensive use of modular components. Circuit designers produce design descriptions, typically at a register-transfer level (RTL). The RTL source description (e.g., Verilog code) is compiled into instances of "cells.". The cells are basic building blocks of circuits, such as gates or memory bit cells. Cells implement logic or other electronic functions. Various foundries and independent cell library vendors provide standard cell libraries. The cells in these libraries have been modeled and qualified, for use with a particular integrated circuit technology. Electronic Design Automation (EDA) tools place the selected standard cells at appropriate locations in the IC floor plan, and route the interconnections between the various cells to generate an IC layout. After a layout is generated, a series of verification and acceptance procedures are performed, including design rule checks (DRC) and layout versus schematic (LVS) checks. When a design has passed its verification procedures, signoff and tapeout occur. The layout is released to a foundry using a standard format, such as GDSII or Oasis.

An IC designer designs circuits using the standard cell libraries that are available at the time a given IC is designed. After the initial release of a given IC, foundries and cell library vendors continue to enhance their cell libraries with new cell designs. It would be costly for IC designers to redesign their ICs to take advantage of later developed cell designs.

BRIEF DESCRIPTION OF THE DRAWINGS

FIGS. 7A and 7B are schematic cross sectional views showing use of a single additional mask to selectively change the gate insulation layer thickness of the subset of devices.

FIGS. 8A and 8B are schematic cross sectional views showing use of a single additional mask to selectively change the source/drain implant dosage of the subset of devices.

DETAILED DESCRIPTION

Figure 1:
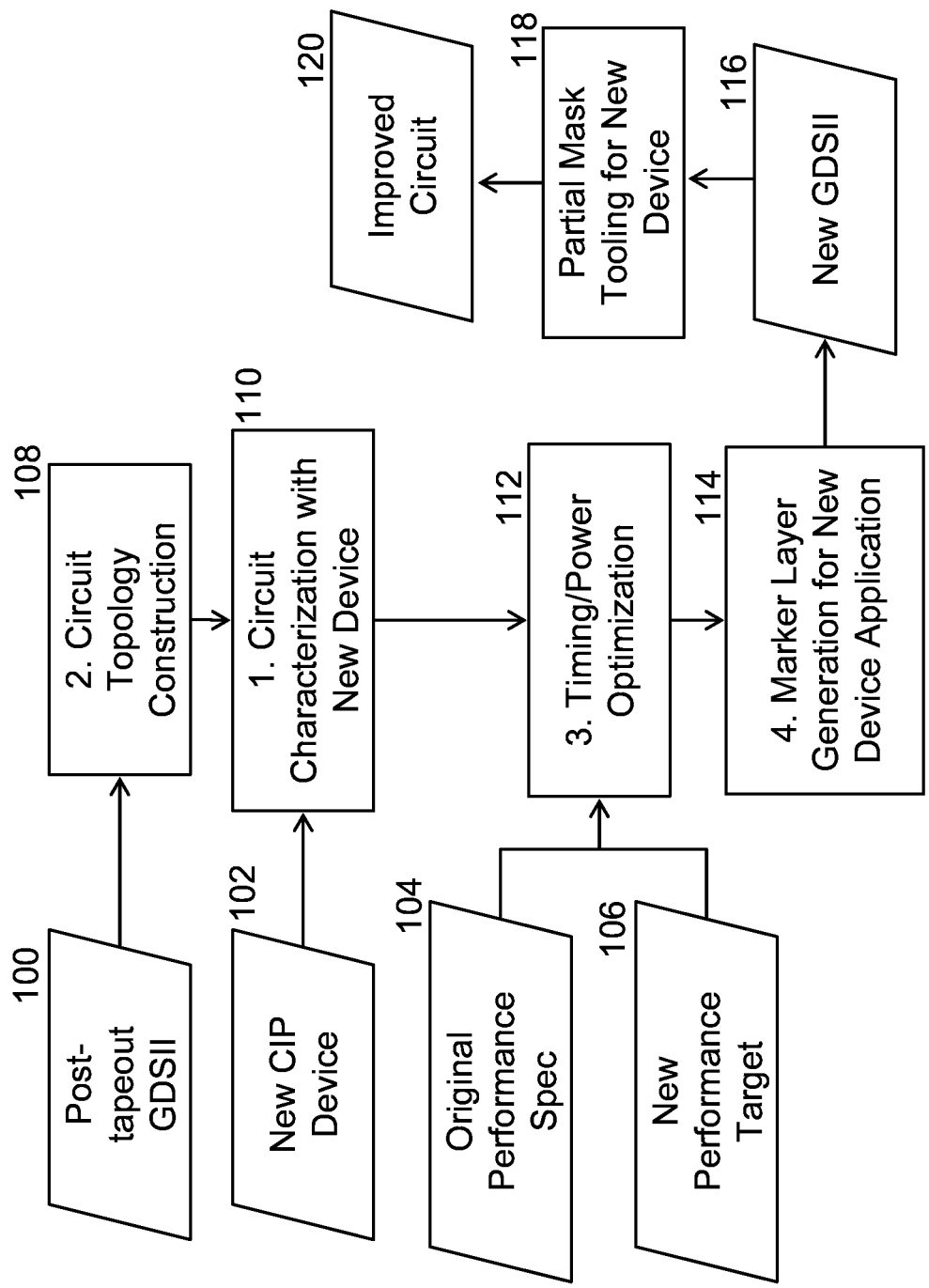
FIG. 1 is a schematic block diagram of an embodiment of a system for modifying an IC layout without relying on source.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Methods and systems are described below for modifying an IC design. The methods and systems are suitable for use after design completion (i.e., after tapeout). Using these techniques, a completed design can be improved to take advantage of improvements in cell design for the same technology node, by adding one or more photomasks, without requiring access to the original Verilog code, and without changing the existing photomask set. Depending on the designer's goals, the layout modifications can improve speed or reduce power consumption. A proper subset of the transistors in the IC can be replaced with a newer transistor, to achieve the designer's new goal. In some embodiments, the change can be implemented by adding a single layout mask for supplementing the existing set of photomasks used to fabricate the IC. The new transistor may differ from the original transistor by a characteristic, such as gate insulation layer thickness, gate length, or source/drain implant dosage.

FIG. 1 is a schematic block diagram of a system for modifying a layout. The inputs to the system include blocks 100, 102, 104 and 106.

Block 100 shows a system input comprising a layout description using a standardized format, such as GDSII, OASIS or the like. The layout description is generated using commercially available EDA tools, such as "IC COMPILER"™, sold by Synopsys, Inc. of Mountain View, Calif., which may include a place and route tool 304, such as "ZROUTE"™, also sold by Synopsis. Other EDA tools 302 may be used, such as the "VIRTUOSO" custom design platform or the Cadence "ENCOUNTER"® digital IC design platform may be used, along with the "VIRTUOSO" chip assembly router, all sold by Cadence Design Systems, Inc. of San Jose, Calif. Unless specifically stated otherwise, the term "layout description," as used below, refers to this input information in the form of GDSII, OASIS or the like. In the embodiment of FIG. 1, the system is configured to generate the layout modifications using the layout description, without requiring access to the original RTL design information.

Block 102 is at least one "continuous improvement plan (CIP)" device design. The continuous improvement plan devices are variations of existing standard cells, optimized to improve a selected characteristic, such as switching time, threshold voltage, leakage, or the like. In some embodiments, the design change to form the CIP device is implemented by adding a single photomask to the set of photomasks of the original design. In some embodiments, the CIP device design differs from the original standard cell library design by gate insulation layer thickness, source/drain implant dosage, or gate length.

Block 104 is an original performance specification for the IC. This includes the specification to be met during static timing analysis, as well as power consumption specifications.

Block 106 is the new device performance target. For example, the target may be to increase IC speed by 25%, or to reduce power consumption by 25%.

Block 108 receives the post-tapeout layout description, and generates a partial netlist for timing critical circuits. The partial netlist includes a list of standard cells and identification of the lines and vias connecting each connected pair of standard cells, for the identified time critical circuits.

Block 110, based on the definition of the new device, incorporates a SPICE level model of the improved device to characterize performance and power consumption.

Block 112 performs timing/power optimization, based on the circuit topology from block 108, the circuit characterization from block 110, and the original and target performance specifications of blocks 104 and 106.

Block 114 generates a marker layer layout mask used for generating an additional photomask. The layout mask allows the foundry to selectively replace transistors in the original layout with the improved transistors by overlaying special marker layer or data-type number on the relevant portion of the layout mask. In some embodiments, the original photomask set is used, along with one single additional photomask, to fabricate ICs with the improved transistor selectively substituted in the critical circuits to meet the new performance target.

Block 116 is the new layout description (e.g., in GDSII format) provided to the foundry, corresponding to the original design plus an additional layout mask for selectively substituting the optimized transistor for a subset of the original transistors.

In a foundry, this additional layout mask is used and logic operations are performed to arrive at a new layout. This makes it possible for the designer or foundry to modify a physical mask by combining this additional layout mask with some of the other original layout masks to produce new physical mask(s).

In some embodiments, certain types of changes are implemented by adding a single new photomask to the original photomask set. For example, a new transistor different from an original transistor only in the implant dosage can be implemented using one additional photomask. In some embodiments, certain types of changes may translate into more than one additional photomask. For example, to produce three different threshold voltage levels on the same die from the foundry, five physical masks are used. Thus, one skilled in the art understands that there is not a one-to-one correspondence between the layout mask and the number of actual physical photomasks which implement the new layout. The additional layout mask is provided to the foundry. And then the foundry combines the layout mask data with the original layout data to come up with the appropriate modification to realize the selective CIP transistor application.

Block 118 is the partial mask tooling for the new device. Depending on the number of types of new devices incorporated into the layout, one or more additional photomasks are added to the original set of photomasks.

At block 120, the improved circuit can be fabricated, using the original photomask set, plus the one or more additional photomasks.

Figure 2:
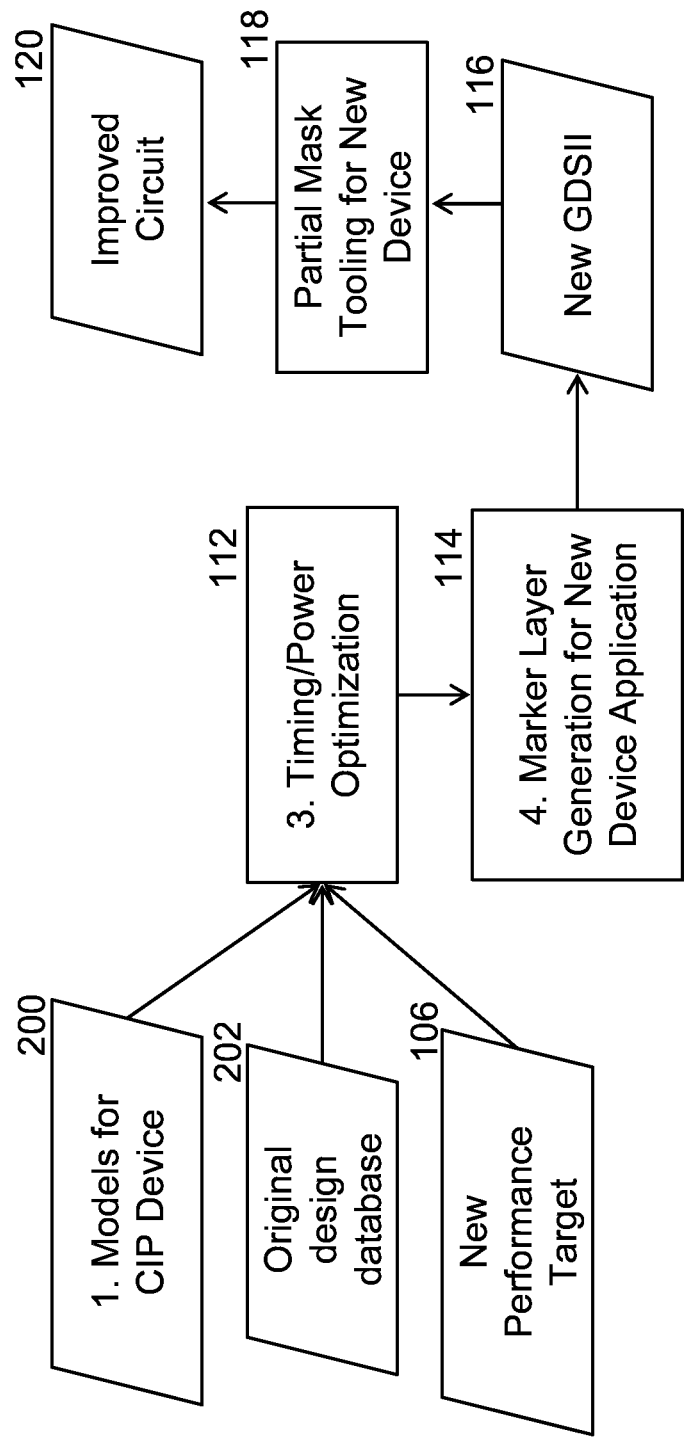
FIG. 2 is a schematic block diagram of an embodiment of a system for modifying an IC layout using source code.

FIG. 2 is a schematic block diagram of the system described above, when the original design database (e.g., RTL description, such as Verilog code) is available to the personnel implementing the design change. In this example, blocks 106, 112, 114, 116, 118 and 120 are the same as described above with reference to FIG. 1, and a description of these blocks is not repeated. The step of providing the medium storing the partial netlist includes providing a gate level netlist that was previously used to fabricate the set of photomasks.

In this example, a more robust set of input is provided, so blocks 108 and 110 are not used. Thus, if the user intends to use the system with the complete design database, an embodiment without blocks 108 or 110 can be used.

The inputs to the system include blocks 200, 202 and 106. Block 200 includes SPICE level models for the improved device.

Block 202 includes the original design database (source code). The standard cells included in the layout are expressly identified in the source, along with the devices to connected to each other. Thus, construction of the netlist of timing critical paths can be performed directly if the original design database is available. Then, given the models of block 200, the circuit performance can be assessed with the improved device substituted for the original devices.

Some embodiments include the capability to perform the flow of FIG. 1. Some embodiments include the capability to perform the flow of FIG. 1. Some embodiments include the capability to perform either the flow of FIG. 1 or the flow of FIG. 2, depending on which data are available.

Figure 3:
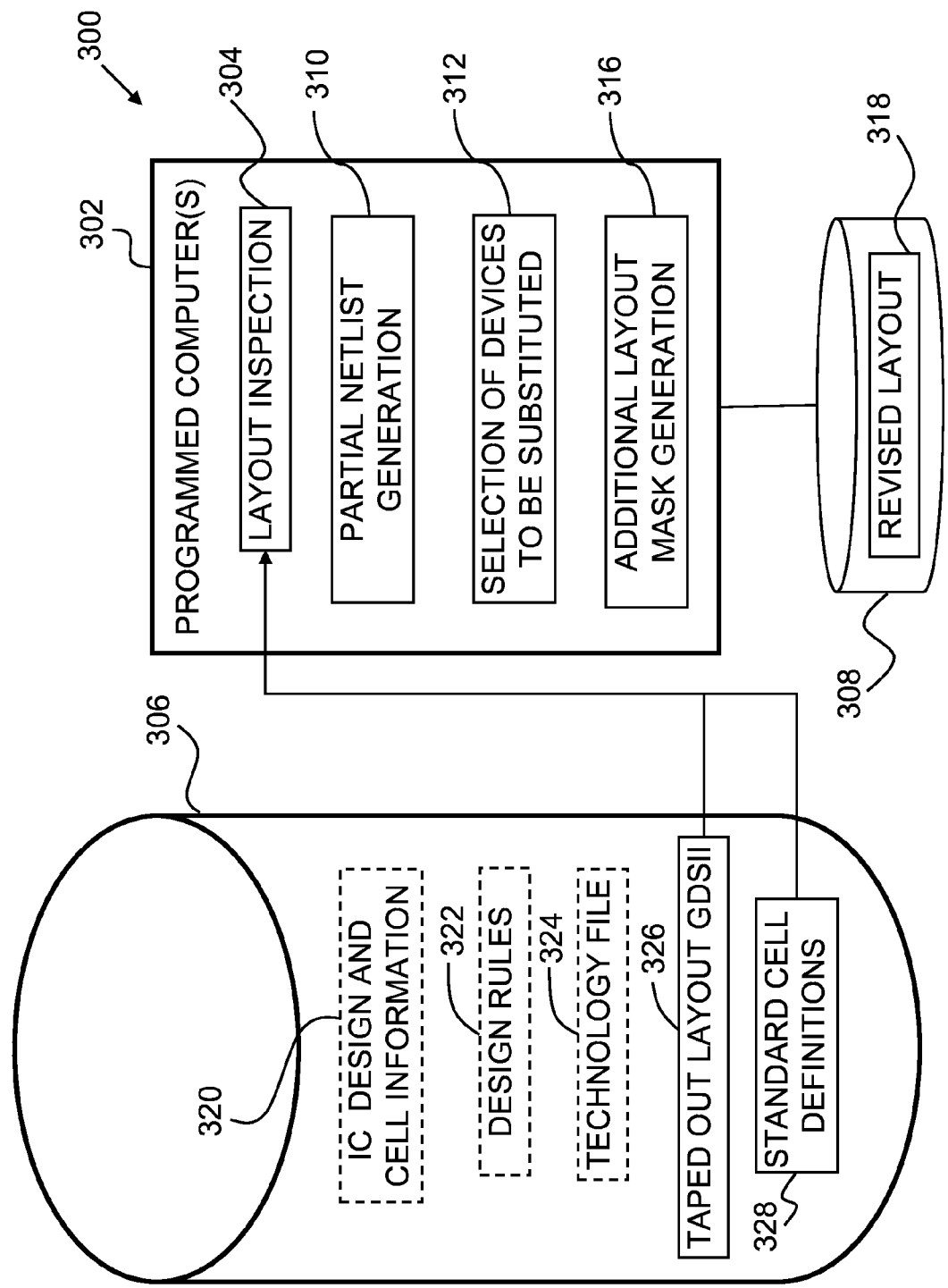
FIG. 3 is hardware block diagram of an example of a system.

FIG. 3 is a hardware block diagram of a computer implemented system for a system used to perform the method.

The system 300 includes at least one programmed computer 302. In some embodiments, all of the program functions are performed in a single computer. In other embodiments, the functions described in FIG. 3 are divided among two or more processors. The two or more processors can be implemented in a single IC chip, plural chips within a single housing, or in plural distinct hosts. If the functions are divided among plural hosts, the hosts can be collocated, or connected to each other by a network, such as a personal area network (PAN), local area network (LAN), wide area network (WAN) or a global communications network such as the internet.

A layout inspection module 304 is provided for inspecting the layout description. This module detects the presence of standard cells in the layout, and identifies the complete routing path connecting a given pair of standard cells.

A partial netlist generation module 310 is provided for generating a partial netlist for timing critical paths, as discussed above with reference to block 108 of FIG. 1.

A module 312 is provided for selecting devices in the original layout for which the new devices are to be substituted.

A module 316 generates an additional layout mask to allow selective substitution of the new devices for the selected original devices to meet the new performance or power target.

The system receives a plurality of inputs from at least one non-transitory computer readable storage medium 306. Although FIG. 3 shows two mediums 306, 308, any number of medium devices can be used. Thus, data can stored in a single device or striped across plural devices. The devices can be collocated, or accessed by the computer 302 across a PAN, LAN, WAN or the Internet. The medium(s) can include media include, for example, RAMs, ROMs, CD-ROMs, DVD-ROMs, BD-ROMs, hard disk drives, flash memories, or any other non-transitory machine-readable storage medium, or any combination thereof.

In some embodiments, the system performs the layout inspection 304 and partial netlist generation 310 based on the taped out GDSII layout data 326 and the standard cell definitions 328. If these are the only data available, the partial netlist is reconstructed from these data.

In other embodiments, where the IC design and cell source code 320 is available, the partial netlist can be generated directly for the timing critical functions. The layout inspection module 304 is bypassed. In this case, the medium can also store design rules 322 and technology specific data 324 for the particular technology level of the IC. These optional data are indicated by dashed boxes in FIG. 3.

The revised layout 318 is stored in a non-transitory, machine readable storage medium, which can be the same medium 306 storing the inputs, or a different medium. In some embodiments, the newly generated layout mask is generated by the foundry and used by the foundry to fabricate the additional photomask(s). In other embodiments, the additional layout mask is generated by the designer and provided to the foundry.

Figure 4:
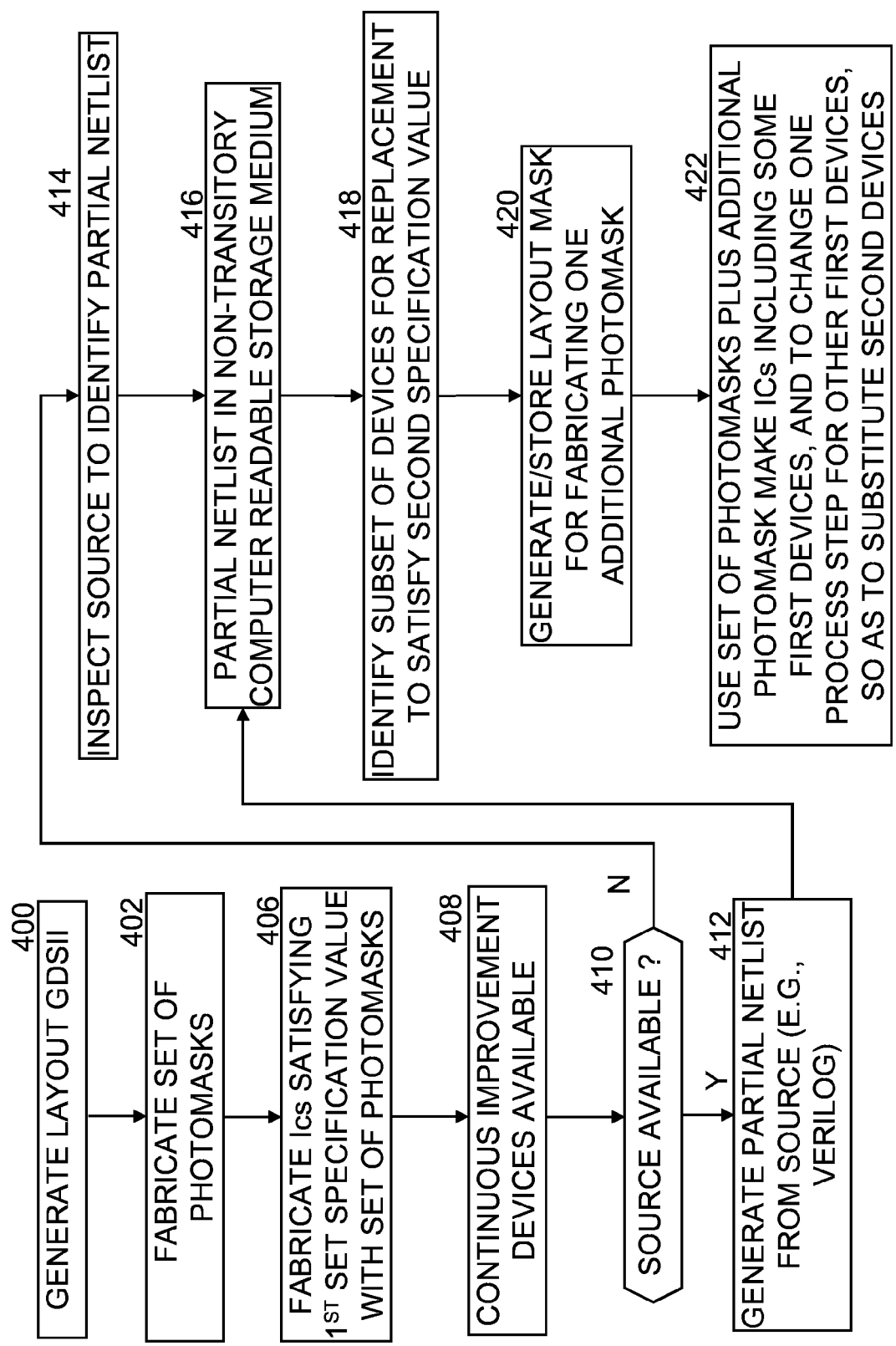
FIG. 4 is a flow chart of a method of modifying a layout.

FIG. 4 is a detailed flow chart of one embodiment of a design improvement process.

At step 400, following original signoff and tapeout, the original layout description is generated in the form of GDSII data, for example.

At step 402, the original set of photomasks is fabricated from the original layout description, to be used in a semiconductor fabrication process.

At step 406, the original set of photomasks is used to fabricate ICs satisfying a first set of specification values.

At step 408, a CIP device is made available by the foundry or standard cell library vendor.

At step 401, a determination is made whether the design RTL source code is available. If the source is available, step 412 is performed next. If the source is not available, steep 414 is performed next.

At step 412, the EDA tool uses the original source design description (e.g., Verilog code) to generate a partial netlist for the IC.

At step 414, if the source is not available, the layout GDSII is inspected to identify the partial netlist.

At step 416, the partial netlist of at least a portion of a previously taped-out integrated circuit (IC) layout is stored in a non-transitory, machine-readable storage medium. The partial netlist represents a set of photomasks for fabricating an IC having the IC layout such that the IC meets a first specification value. This step includes identifying a plurality of standard cells in the portion of the previously taped-out IC layout; and identifying inter-connections between each of the plurality of standard cells.

At step 418, the computer 302 identifies a proper subset of a plurality of first devices in the IC layout, such that replacement of the proper subset of the first devices by second devices in a revised IC layout satisfies a second specification value different from the first specification value.

At step 420, at least one layout mask is generated and stored in at least one non-transitory machine readable storage medium, accessible by a tool for forming at least one additional photomask, such that the set of photomasks and the at least one additional photomask are usable to fabricate an IC according to the revised IC layout. The generating step 420 is performed without changing any of the photomasks in the set of photomasks.

At step 422, the original set of photomasks and the additional photomask are used to make ICs including some of the first devices (i.e., the original transistor design), and to change one process step for other first devices, so as to substitute second devices (i.e., the improved devices). In various embodiments, this is accomplished by either addition of at least one process step, or either a change or an addition or a combination of a change and an addition. The process flow disclosed herein does not require a wholesale change of process steps that universally apply changes to every device. Rather, this disclosure permits substituting a different or special device for some (fewer than all) of the devices in the taped out design, in order to strike a trade-off for design quality. The "additional" process step is provided to distinguish those "different" or "special" device instances, which are to be processed differently.

Figure 5:
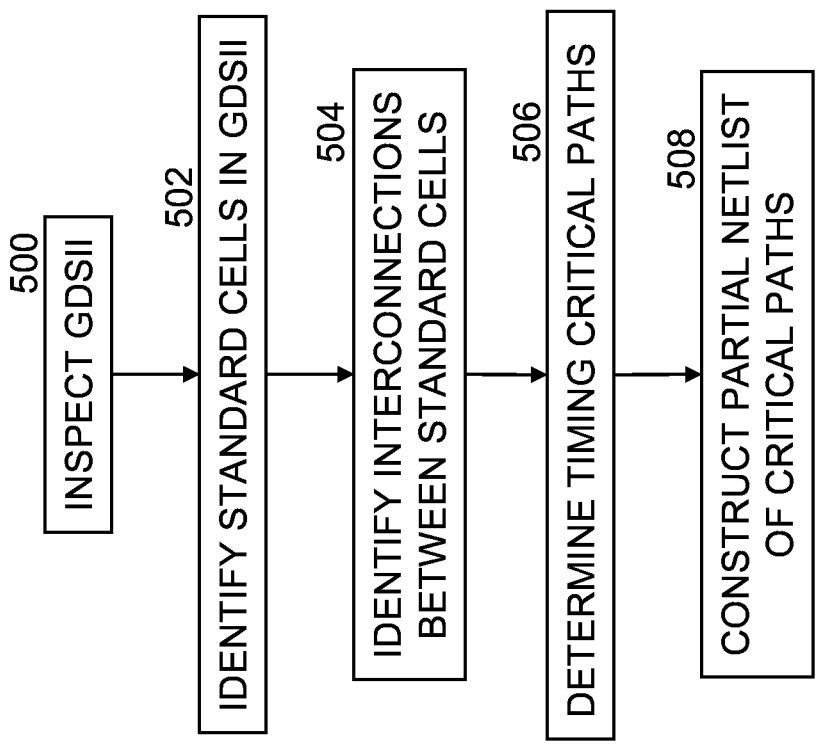
FIG. 5 is a flow chart of the step of generating a netlist from GDSII in FIG. 4.

FIG. 5 is a flow chart of the inspection method described above, for the case in which the design source description is not available to the foundry.

At step 500, the layout description GDSII is inspected.

At step 502, standard cells in the GDSII are identified. For example, in some embodiments, the foundry has a description of the layout corresponding to the standard cell library used to synthesize the IC layout. Each standard cell has a set of polygons that can be compared to polygons detected in the layout description. In some embodiments, polygons within a single layer are sufficient to uniquely identify a particular standard cell. Features of at least one layer of a standard cell of a cell library are compared against corresponding features in at least one photomask of the set of photomasks. The detected features are identified as being part of an instance of the standard cell if the features of the at least one layer of the standard cell match the corresponding features in the at least one photomask.

At step 504, the interconnections between pairs of the standard cells are determined. For example in some embodiments, the interconnections are determined by tracing the connecting lines and vias connected to one of the cells across each successive layer in the connecting path, until the second cell is reached. For example, given a line and via in the M1 layer connected to a cell, the line connected to the same via in another metal layer (e.g., M2) is found. Another via connected to the same line is found, and followed to the next line layer, and so forth.

At step 506, the critical timing paths within the partial netlist are determined. Details of this step are described below in the discussion of FIG. 6.

At step 508 of FIG. 5, the partial netlist of time critical paths is constructed, to include the time critical paths identified in step 506. The partial netlist is stored in a computer readable storage medium.

Figure 6:
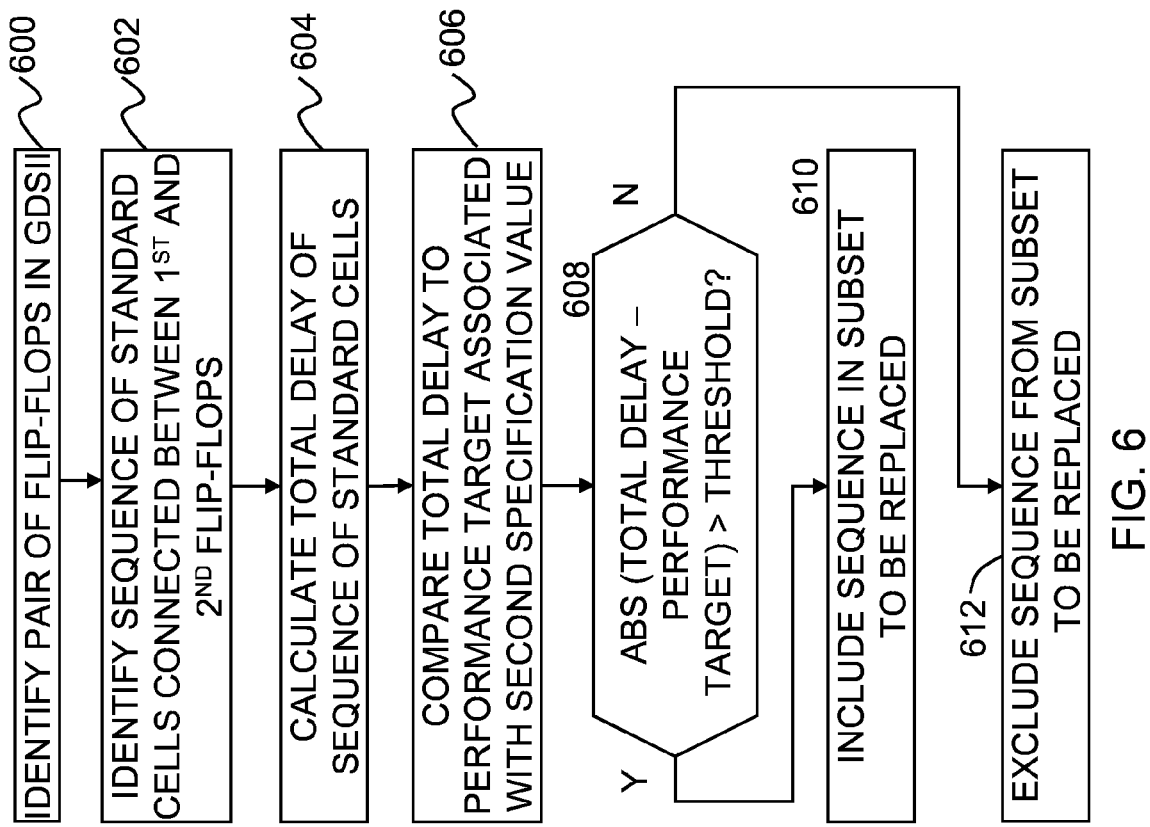
FIG. 6 is a flow chart of the step of identifying a subset of devices for replacement in FIG. 4.

FIG. 6 is a detailed flow diagram of the method of identifying time critical paths which is performed in some embodiments for identifying the proper subset of the plurality of first devices.

At step 600, the system identifies a pair of flip flops containing first and second flip-flops in the IC layout, based on the GDSII data.

At step 602, the system identifies a sequence of one or more standard cells connected between the first and second flip-flops.

At step 604, the system calculates a total delay incurred by a signal being processed by the sequence of one or more standard cells. This is achieved by adding up the known delays for each element in the path, based on the characterizations of each device in the standard cell library.

At step 606, the system compares the total delay to a performance target associated with the second specification value. For example, if the goal is to increase IC speed, the computer identifies which standard cells are flip flops, and determines if there exists any sequence of standard cells between flip flops that incur some delay which is long enough to violate the new performance target. And if that is the case, then that sequence of standard cells would be subject to speed up, and would be replaced by the new faster device in the improved layout.

Although an example is provided above, which includes identification of standard cells, this is not essential in the detection of timing paths, Although some embodiments include forming cell-level partial netlist for analysis efficiency sake; other embodiments of the method construct a transistor level netlist and find timing critical paths. A static analysis method also based on tracing transistors, their interconnection as well as the "feedback"-connected structures that can provide equivalent timing path information. In order to determine where the paths start and end with a transistor level netlist, one builds a connection pattern database that identifies the "feedback" structures that are stereotypical in state elements.

In another example where the goal is to reduce power consumption, the computer identifies which standard cells are flip flops, and determines if there exists any sequence of standard cells between flip flops that incur some delay which is much less than the performance target (This represents design margin). And if that is the case, the computer determines that the new devices with slower performance and reduced power consumption can be used to slow down the path containing these cells and save power, without violating the new performance target.

At step 608, a determination is made whether the absolute value of the difference between the total delay and the new performance target associated with the second specification value is greater than a threshold value. In other words, the system determines whether the total delay between the 2 flip-flops is either greater than or less than the target by more than a threshold value. If the result is .TRUE., step 610 is performed. If the result is .FALSE., then step 612 is performed.

At step 610, the sequence of one or more standard cells is included in the proper subset if the total delay differs from the performance target by more than a threshold value. The first devices in the sequence will be replaced with second devices containing the CIP improvement.

In some embodiments, the target is to increase performance (speed). The step of generating the at least one layout mask is performed so that the additional photomask causes the second devices in the IC layout to have increased performance relative to the first devices, if the total delay is longer than the performance target by the threshold value.

In some embodiments, the target is to decrease power consumption. The step of generating the at least one layout mask is performed so that the additional photomask causes the second devices in the IC layout to have reduced power consumption relative to the first devices, if the total delay is shorter than the performance target by the threshold value.

At step 612, the sequence of one or more standard cells is excluded from the proper subset if the total delay differs from the performance target by more than a threshold value. The first devices in the sequence are not replaced.

In some embodiments, the original set of photomasks are used to perform a plurality of semiconductor process steps; and the additional photomask is configured to selectively change a total exposure time of the proper subset of the first devices to one of the plurality of process steps, so that the processing time of the proper subset of the first devices in the one processing step is different from the process time in the one processing step of any first device excluded from the proper subset. FIGS. 7A-9B show three examples. FIGS. 7A-9B are schematic, for representing the use of masks to control regions exposed to various process steps. It is understood that actual mask configurations differ.

In various embodiments, the set of photomasks are used to perform a plurality of semiconductor process steps; and the at computer 302 is configured to generate the additional layout mask so that the additional photomask is configured to selectively change a total exposure time of the proper subset of the first devices to one of the plurality of process steps, so that the processing time of the proper subset of the first devices in the one processing step is different from the process time in the one processing step of any first device excluded from the proper subset. In some embodiments, the total exposure time to a process step includes a total time for performing a process step (e.g., deposition, implant, photoresist exposure) twice, such that the devices of the original transistor type are subjected to that process step only one of the two times, and the transistors of the new type are subjected to that process step both times.

Because the original photomask set is used for all of the original devices that will remain unchanged in the improved layout, it is not necessary to redesign the original IC from scratch, and it is not necessary to replace the original photomask set. Further, because the original photomasks are used, it is not necessary to have access to the original RTL (e.g., Verilog) source used in the original design in order to implement the improvements.

In other embodiments, where more than one type of new device is substituted, a corresponding number of layout masks are added. For each new device type, a corresponding proper subset of the transistors in the IC is selectively subjected to a respective process step a second time to change the device characteristic.

FIGS. 7A and 7B are schematic diagrams showing an example in which the additional photomask is configured to selectively change an exposure time of the proper subset of first devices 700 to a gate insulation layer forming process. In FIGS. 7A and 7B, the source/drain regions 702 and gate electrode 706 are shown in phantom as a reference for ease of understanding the gate insulation layer 704, 708 being shown. The focus of FIGS. 7A and 7B is on the configuration of the device at the time of deposition of the gate insulation layer. One of ordinary skill understands that the gate electrode layer 706 has not yet been formed, and the gate insulation layer 704 has not yet been etched at this stage of processing. A shallow trench isolation (STI) region 701 is also shown.

FIG. 7A schematically shows the original photomask P1, having identical apertures A1 and A2 corresponding to gate insulation layer 704 material to be deposited on the surface of the substrate. For example, the gate insulation layer 704 can be deposited by a chemical vapor deposition (CVD), physical vapor deposition (PVD), atomic layer deposition (ALD), or the like. The mask P1 is the same mask used to fabricate the design of the original layout. This mask is used for making identical transistors 800. A gate insulation layer thickness T1 is achieved in both of the devices shown.

In FIG. 7B, a second photomask P2 is shown having only the aperture A2, for selectively allowing deposition of gate insulation material only on the right device 710. Thus, the device 710 has a gate insulation layer of a thickness T2 thicker than the thickness T1 of device 700. Thus, for the proper subset of devices to be replaced, a second gate insulation layer deposition step is added, so that the total thickness is increased for selected devices. The devices 700 which are not exposed by the second mask P2 keep the original thickness.

The additional mask permits a differential in gate insulation layer thickness. Although the example of FIGS. 7A and 7B shows the original thickness T1 maintained in devices 700 and a thicker thickness T2 in the new devices 710, a similar technique can be used to selectively make the gate insulation layer of the devices 700 thinner than the original thickness T1, and the thickness of the insulation layer for the devices 710 equal the original thickness T1. Then the group of devices having the thinner gate insulating layer would be the new devices. Thus, the technique can be used to implement thicker or thinner gate insulation layers, relative to the original device used in the taped out layout.

FIGS. 8A and 8B schematically show an example, wherein the additional photomask P2 is configured to selectively change an exposure time of the proper subset of first devices to an ion implantation process.

FIG. schematically 8A shows an original mask used for controlling the regions implanted with dopant. In FIG. 8A, a pair of transistors 800 is shown, each having source/drain regions 802, gate insulation layer 804 and gate electrode 806. An STI region 801 is also shown. A first mask P1 is shown for providing the source drain implants. Both transistors 800 are exposed to the same implant dosage. In this example, N-type ions are implanted, so that each source drain region is an N+ region having the same dopant dosage.

In FIG. 8B, an additional mask P2 protects the left transistor 800, while the right transistor is exposed to allow an additional implant dosage, to provide source/drain implant regions 802', which have a higher ion concentration that regions 802.

The additional mask P2 permits a differential in source/drain implant dosage. Although the example of FIGS. 8A and 8B shows the original dosage N+ maintained in devices 800 and a higher dosage N++ in the new devices 810, a similar technique can be used to selectively make the implant dosage of the devices 700 smaller than the original dosage, and the dosage of the source/drain regions 802' for the devices 810 equal the original dosage. Then the group of devices having the lower dosage would be the new devices. Thus, the technique can be used to implement higher or lower source/drain implant dosage, relative to the original device used in the taped out layout.

Figure 9A:
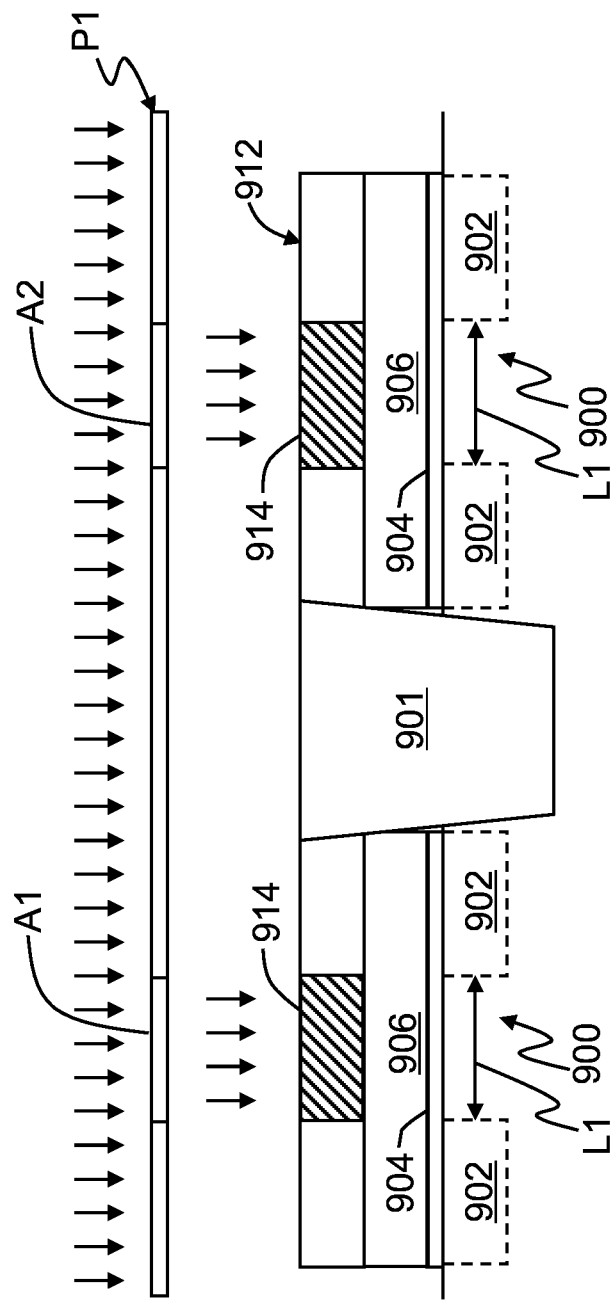
FIGS. 9A and 9B are schematic cross sectional views showing use of a single additional mask to selectively change the gate length of the subset of devices.
Figure 9B:
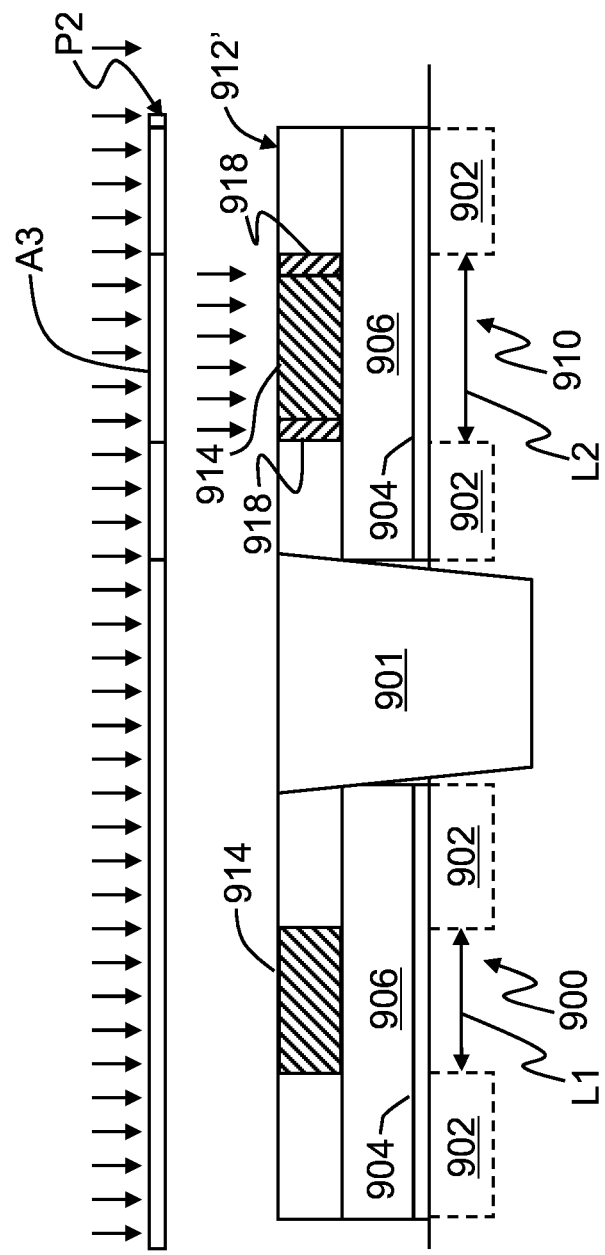

FIGS. 9A and 9B schematically show another example, wherein the additional photomask is configured to selectively change a length of gate sidewall spacers of the proper subset of first devices. The gate insulation layer 904 and gate electrode layer 906 are shown before patterning. The locations where the source/drain regions 902 will be formed are shown in phantom. An SIT region 901 is also shown.

In FIGS. 9A and 9B, the masks P1 and P2 are used to selectively expose portions of a photoresist 912. In FIG. 9A, the mask P1 exposes a portion 914 of the photoresist 912 above the region where the gate electrode 906 is to be formed. The mask P1 has identical apertures A1 and A2, so that both the transistors 900 of the original layout are identical, with the same gate length L1.

FIG. 9B shows an additional mask that is used to further expose a portion of the photoresist 912. In this example, a negative photoresist is used, so that the portion 914 of the photoresist layer 912 that is exposed to light becomes insoluble to photoresist developer. The unexposed portion of the photoresist can then be dissolved by the photoresist developer. In FIG. 8B, the additional mask P2 has a larger aperture A3 above the location where the gate electrode of the new device 910 is to be formed. This permits exposure of the additional regions 918, also rendering them insoluble. As a result, the subsequently formed gate length L2 will be longer than the gate length L1 of the original devices.

Figure 10A:
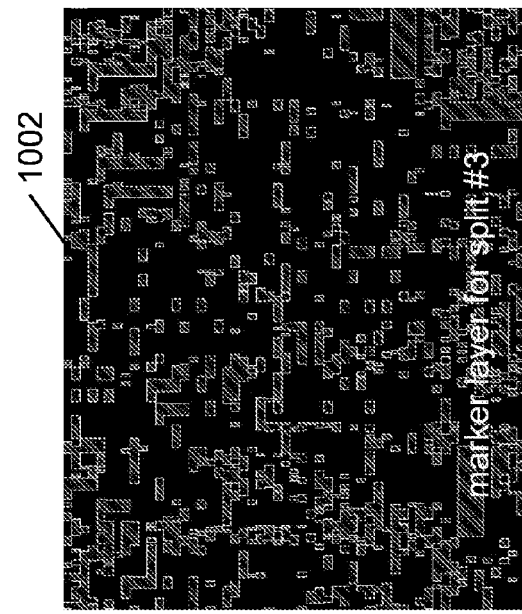
FIGS. 10A-10C show three examples of marker layer layout masks for improving a previously taped-out IC design.
Figure 10B:
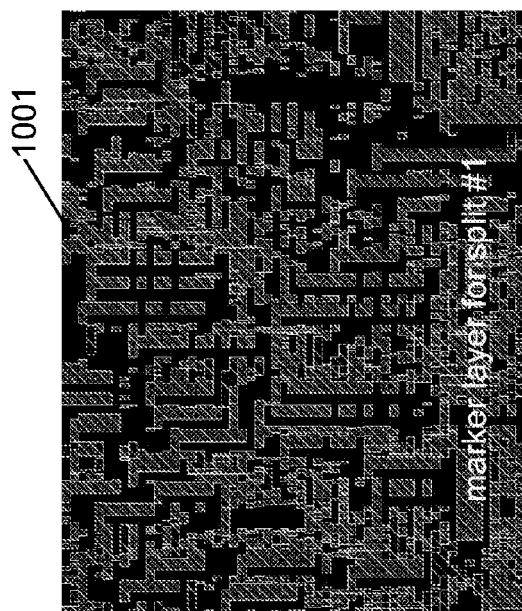
Figure 10C:
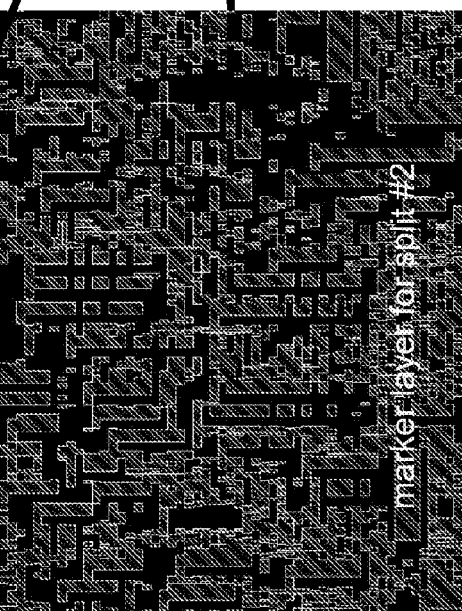
Figure 10D:
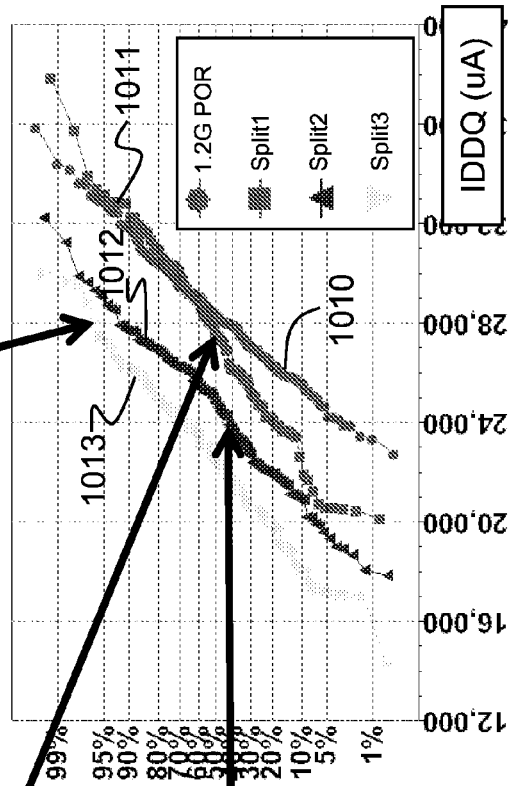
FIG. 10D is a diagram of IDDQ results for an original IC layout, and for the layout modified to selectively replace devices using the layout masks of FIGS. 10A-10C.

FIGS. 10A-10C show three different layout masks 1001, 1002, 1003, respectively, which can be used for the same original IC layout, to select respectively different first, second and third subsets of devices (e.g., transistors) in an IC to be replaced by optimized devices for reducing leakage. FIG. 10D shows simulation results. Curve 1010 shows the quiescent supply current (IDDQ) for the original IC layout. Curve 1011 shows IDDQ for using layout mask 1001 and the original mask set. Curve 1012 shows IDDQ for using layout mask 1002 and the original mask set. Curve 1013 shows IDDQ for using layout mask 1003 and the original mask set. The results show that each layout mask results in a different IDDQ profile for the IC, without compromising compliance with performance specifications.

Although examples are described above in which the layout mask is used to select a subset of the transistors in an IC for replacement by improved transistors, in other embodiments, the layout mask is used to selectively upgrade other devices, such as diodes, MOS capacitors and varactors.

In some embodiments, a method comprises providing a non-transitory, machine-readable storage medium storing a partial netlist of at least a portion of a previously taped-out integrated circuit (IC) layout, representing a set of photomasks for fabricating an IC having the IC layout such that the IC meets a first specification value. A computer identifies a proper subset of a plurality of first devices in the IC layout, such that replacement of the proper subset of the first devices by second devices in a revised IC layout satisfies a second specification value different from the first specification value. At least one layout mask is generated and stored in at least one non-transitory machine readable storage medium, accessible by a tool for forming at least one additional photomask, such that the set of photomasks and the at least one additional photomask are usable to fabricate an IC according to the revised IC layout.

In some embodiments, a system comprises a non-transitory, machine-readable storage medium storing a partial netlist of at least a portion of a previously taped-out integrated circuit (IC) layout, representing a set of photomasks for fabricating an IC having the IC layout such that the IC meets a first specification value. At least one processor is configured to identify a proper subset of a plurality of first devices in the IC layout, such that replacement of the proper subset of the first devices by second devices in a revised IC layout satisfies a second specification value different from the first specification value. The at least one processor is further configured to generate and storing in at least one non-transitory machine readable storage medium at least one layout mask, accessible by a tool for forming at least one additional photomask, such that the set of photomasks and the at least one additional photomask are usable to fabricate an IC according to the revised IC layout.

In some embodiments, at least one non-transitory computer readable storage medium encoded with computer program instructions, such that when the computer program instructions are executed by a computer, the computer performs the method comprising accessing a non-transitory, machine-readable storage medium containing a partial netlist of at least a portion of a previously taped-out integrated circuit (IC) layout, representing a set of photomasks for fabricating an IC having the IC layout such that the IC meets a first specification value. The computer identifies a proper subset of a plurality of first devices in the IC layout, such that replacement of the proper subset of the first devices by second devices in a revised IC layout satisfies a second specification value different from the first specification value. At least one layout mask is generated and stored in at least one non-transitory machine readable storage medium, accessible by a tool for forming at least one additional photomask, such that the set of photomasks and the at least one additional photomask are usable to fabricate an IC according to the revised IC layout.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. In various embodiments, the media include, for example, RAMs, ROMs, CD-ROMs, DVD-ROMs, BD-ROMs, hard disk drives, flash memories, or any other non-transitory machine-readable storage media, wherein, when the computer program code is executed by a computer, the computer becomes an apparatus for practicing the method. When the computer program code is accessed by the computer, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
providing a non-transitory, machine-readable storage medium storing a partial netlist of at least a portion of a previously taped-out integrated circuit (IC) layout, representing a set of photomasks for fabricating an IC having the IC layout such that the IC meets a first specification value;
identifying by a computer a proper subset of a plurality of first devices in the IC layout, such that replacement of the proper subset of the first devices by second devices in a revised IC layout satisfies a second specification value different from the first specification value; and
generating and storing in at least one non-transitory machine readable storage medium at least one layout mask corresponding to the proper subset of the plurality of first devices, the layout mask accessible by a tool for forming at least one additional photomask that changes a process step performed using one of the set of photomasks, such that the set of photomasks and the at least one additional photomask are configured to fabricate an IC according to the revised IC layout.

2. The method of claim 1, wherein the generating step is performed without changing any of the photomasks in the set of photomasks.

3. The method of claim 1, wherein:
the set of photomasks are used to perform a plurality of semiconductor process steps; and
the additional photomask is configured to selectively change a total exposure time of the proper subset of the first devices to one of the plurality of process steps, so that the processing time of the proper subset of the first devices in the one processing step is different from the process time in the one processing step of any first device excluded from the proper subset.

4. The method of claim 3, wherein the additional photomask is configured to selectively change an exposure time of the proper subset of first devices to a gate insulation layer forming process.

5. The method of claim 3, wherein the additional photomask is configured to selectively change an exposure time of the proper subset of first devices to an ion implantation process.

6. The method of claim 3, wherein the additional photomask is configured to selectively change a length of gate sidewall spacers of the proper subset of first devices.

7. The method of claim 1, wherein the step of providing the medium containing the partial netlist includes:
(a) identifying a plurality of standard cells in the portion of the previously taped-out IC layout; and
(b) identifying inter-connections between each of the plurality of standard cells, wherein steps (a) and (b) are based on inspection of layouts of the set of photomasks.

8. The method of claim 7, step (a) includes:
comparing features of at least one layer of a standard cell of a cell library against corresponding features in at least one photomask of the set of photomasks; and
identifying the features as being part of an instance of the standard cell if the features of the at least one layer of the standard cell match the corresponding features in the at least one photomask.

9. The method of claim 7, wherein the inspection of layouts includes inspection of a GDS II representation of the layouts.

10. The method of claim 1, wherein the step of providing the medium storing the partial netlist includes providing a gate level netlist that was previously used to fabricate the set of photomasks.

11. The method of claim 1, wherein the step of identifying the proper subset of the plurality of first devices includes:
identifying first and second flip-flops in the IC layout;
identifying a sequence of one or more standard cells connected between the first and second flip-flops;
calculating a total delay incurred by a signal being processed by the sequence of one or more standard cells;
comparing the total delay to a performance target associated with the second specification value; and
including the sequence of one or more standard cells in the proper subset if the total delay differs from the performance target by more than a threshold value.

12. The method of claim 11, wherein the step of generating the at least one layout mask is performed so that the additional photomask causes the second devices in the IC layout to have increased performance relative to the first devices, if the total delay is longer than the performance target by the threshold value.

13. The method of claim 11, wherein the step of generating the at least one layout mask is performed so that the additional photomask causes the second devices in the IC layout to have reduced power consumption relative to the first devices, if the total delay is shorter than the performance target by the threshold value.

14. A system comprising:
a non-transitory, machine-readable storage medium storing a partial netlist of at least a portion of a previously taped-out integrated circuit (IC) layout, representing a set of photomasks for fabricating an IC having the IC layout such that the IC meets a first specification value;
at least one processor configured to identify a proper subset of a plurality of first devices in the IC layout, such that replacement of the proper subset of the first devices by second devices in a revised IC layout satisfies a second specification value different from the first specification value; and the at least one processor further configured to generate and storing in at least one non-transitory machine readable storage medium at least one layout mask corresponding to the proper subset of the plurality of first devices, the layout mask accessible by a tool for forming at least one additional photomask that changes a process step performed using one of the set of photomasks, such that the set of photomasks and the at least one additional photomask are usable configured to fabricate an IC according to the revised IC layout.

15. The system of claim 14, wherein:

the set of photomasks are used to perform a plurality of semiconductor process steps; and the at least one processor is configured to generate the additional layout mask so that the additional photomask is configured to selectively change a total exposure time of the proper subset of the first devices to one of the plurality of process steps, so that the processing time of the proper subset of the first devices in the one processing step is different from the process time in the one processing step of any first device excluded from the proper subset.

16. The system of claim 14, wherein the processor is further configured to generate and store the partial netlist by:

comparing features of at least one layer of a standard cell of a cell library against corresponding features in at least one photomask of the set of photomasks; and identifying the features as being part of an instance of the standard cell if the features of the at least one layer of the standard cell match the corresponding features in the at least one photomask.

17. The system of claim 14, wherein the processor is further configured for identifying the proper subset of the plurality of first devices by:

identifying first and second flip-flops in the IC layout;

identifying a sequence of one or more standard cells connected between the first and second flip-flops;

calculating a total delay incurred by a signal being processed by the sequence of one or more standard cells;

comparing the total delay to a performance target associated with the second specification value; and including the sequence of one or more standard cells in the proper subset if the total delay differs from the performance target by more than a threshold value.

18. At least one non-transitory computer readable storage medium encoded with computer program instructions, such that when the computer program instructions are executed by a computer, the computer performs the method comprising:

accessing a non-transitory, machine-readable storage medium containing a partial netlist of at least a portion of a previously taped-out integrated circuit (IC) layout, representing a set of photomasks for fabricating an IC having the IC layout such that the IC meets a first specification value;

identifying by the computer a proper subset of a plurality of first devices in the IC layout, such that replacement of the proper subset of the first devices by second devices in a revised IC layout satisfies a second specification value different from the first specification value; and generating within the computer and storing in at least one non-transitory machine readable storage medium at least one layout mask corresponding to the proper subset of the plurality of first devices, the layout mask accessible by a tool for forming at least one additional photomask that changes a process step performed using one of the set of photomasks, such that the set of photomasks and the at least one additional photomask are configured to fabricate an IC according to the revised IC layout.

19. The non-transitory computer readable storage medium of claim 18, wherein the computer program instructions are adapted to configure the computer to generate and store the partial netlist by:

comparing features of at least one layer of a standard cell of a cell library against corresponding features in at least one photomask of the set of photomasks; and identifying the features as being part of an instance of the standard cell if the features of the at least one layer of the standard cell match the corresponding features in the at least one photomask.

20. The non-transitory computer readable storage medium of claim 19, wherein the computer program instructions are adapted to configure the computer for identifying the proper subset of the plurality of first devices by:

identifying first and second flip-flops in the IC layout;

identifying a sequence of one or more standard cells connected between the first and second flip-flops;

calculating a total delay incurred by a signal being processed by the sequence of one or more standard cells;

comparing the total delay to a performance target associated with the second specification value; and including the sequence of one or more standard cells in the proper subset if the total delay differs from the performance target by more than a threshold value.

* * * * *

UNITED STATES PATENT AND TRADEMARK OFFICE
CERTIFICATE OF CORRECTION

PATENT NO. : 8,826,195 B2  Page 1 of 1
APPLICATION NO. : 13/530164
DATED : September 2, 2014
INVENTOR(S) : Meng-Xiang Lee et al.

It is certified that error appears in the above-identified patent and that said Letters Patent is hereby corrected as shown below:

In the Claims:

Claim 14, Column 13, Line 12 – delete "usable"

Signed and Sealed this
Twenty-first Day of July, 2015

Michelle K. Lee
*Director of the United States Patent and Trademark Office*